US008990549B2

(12) United States Patent
Nautiyal et al.

(10) Patent No.: US 8,990,549 B2
(45) Date of Patent: Mar. 24, 2015

(54) METHOD AND SYSTEM FOR BOOTING ELECTRONIC DEVICE FROM NAND FLASH MEMORY

(75) Inventors: Hemant Nautiyal, Greater Noida (IN); Nitin Gera, Delhi (IN); Amit Rao, Ghaziabad (IN); Prabhjot Singh, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 386 days.

(21) Appl. No.: 13/547,045

(22) Filed: Jul. 12, 2012

(65) Prior Publication Data

US 2014/0019741 A1 Jan. 16, 2014

(51) Int. Cl.
G06F 9/44 (2006.01)
(52) U.S. Cl.
CPC .................................. *G06F 9/4408* (2013.01)
USPC ............................................................ 713/2
(58) Field of Classification Search
None
See application file for complete search history.

(56) References Cited

U.S. PATENT DOCUMENTS

| 7,257,703 | B2 | 8/2007 | Kishida et al. |
| 7,370,138 | B2 | 5/2008 | Kim |
| 7,707,354 | B2 | 4/2010 | Lee et al. |
| 7,849,302 | B2 | 12/2010 | Wu |
| 2004/0017708 | A1 | 1/2004 | Choi |
| 2004/0076069 | A1 | 4/2004 | Voth |
| 2006/0195650 | A1* | 8/2006 | Su et al. ........................ 711/103 |
| 2007/0211559 | A1 | 9/2007 | Choi |
| 2008/0126776 | A1* | 5/2008 | Takayama ......................... 713/1 |
| 2008/0294838 | A1* | 11/2008 | Houston et al. ............... 711/103 |
| 2010/0005282 | A1 | 1/2010 | Smith |
| 2011/0078432 | A1 | 3/2011 | Wu |

* cited by examiner

*Primary Examiner* — Paul Yanchus, III
(74) *Attorney, Agent, or Firm* — Charles Bergere

(57) ABSTRACT

A method and system for booting an electronic device from a NAND flash memory includes a NAND flash controller that receives an event trigger for fetching a pre-boot code stored in the NAND flash memory. Based on the event trigger type, booting parameters are loaded into the controller including a boot frequency of the NAND flash memory. The controller searches for a good memory block in which the pre-boot code is stored by checking the first and second or the first and last pages of a memory block and fetches a portion or the entire pre-boot code based on the event trigger type at the boot frequency.

14 Claims, 3 Drawing Sheets

METHOD AND SYSTEM FOR BOOTING ELECTRONIC DEVICE FROM NAND FLASH MEMORY

BACKGROUND OF THE INVENTION

The present invention relates generally to electronic devices, and, more particularly, to booting an electronic device using a NAND flash memory.

Electronic devices often use flash memories for storing code and data, including that required for booting the electronic device (also referred to as a pre-boot code). NAND flash memories are non-volatile, inexpensive, and facilitate efficient read/write operations, and therefore, are preferred to store the pre-boot code in electronic devices. A NAND flash memory includes multiple memory blocks and each memory block includes multiple pages. A NAND flash controller fetches the pre-boot code from the NAND flash memory and provides the pre-boot code to a processor of the electronic device and the processor initiates the boot process upon receiving the pre-boot code.

Currently, there is no universally accepted standard for NAND flash memories. That is, different vendors manufacture NAND flash memories having different specifications. For example, NAND flash memories may have different boot frequencies, and different sizes of memory blocks and pages. A single NAND flash controller may be connected to several NAND flash memories, each having different specifications, which makes it difficult for the controller to choose an optimum boot frequency for fetching the pre-boot code. In such a case, the controller fetches the pre-boot code at the frequency of the NAND flash memory having the lowest booting frequency. Thus, the controller is forced to operate at the lowest booting frequency even when it is accessing NAND flash memories with higher booting frequencies, which considerably slows the boot process.

When the electronic device is powered on or reset, a trigger is sent to the NAND flash controller to fetch the pre-boot code and a reset configuration word (RCW) load prompt or a boot load prompt is triggered. The RCW load prompt requires the entire pre-boot code to be fetched. However, the RCW load prompt requires only a portion of the pre-boot code to be fetched. Existing NAND flash controllers fail to identify the type of trigger and fetch the entire pre-boot code for both the RCW and boot load prompts, thereby making the boot process inefficient.

A NAND flash memory block may be a good or a bad memory block. A good memory block stores the pre-boot code and a bad memory block is a corrupted block. Each memory block has a bad block indicator (BBI) that indicates whether the memory block is good or bad. The BBI is located in the first, second, or last page of the memory block. Existing NAND flash controllers either fetch the pre-boot code from a fixed, predetermined location of the NAND flash memory or search for a first good memory block in which the pre-boot code is stored by checking only the first two pages of a memory block, which makes the good memory block search inefficient.

It would be advantageous to have a system for booting an electronic device from a NAND flash memory that offers flexibility to operate at different boot frequencies and efficiently search good memory blocks, and that overcomes the above mentioned limitations of existing boot systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
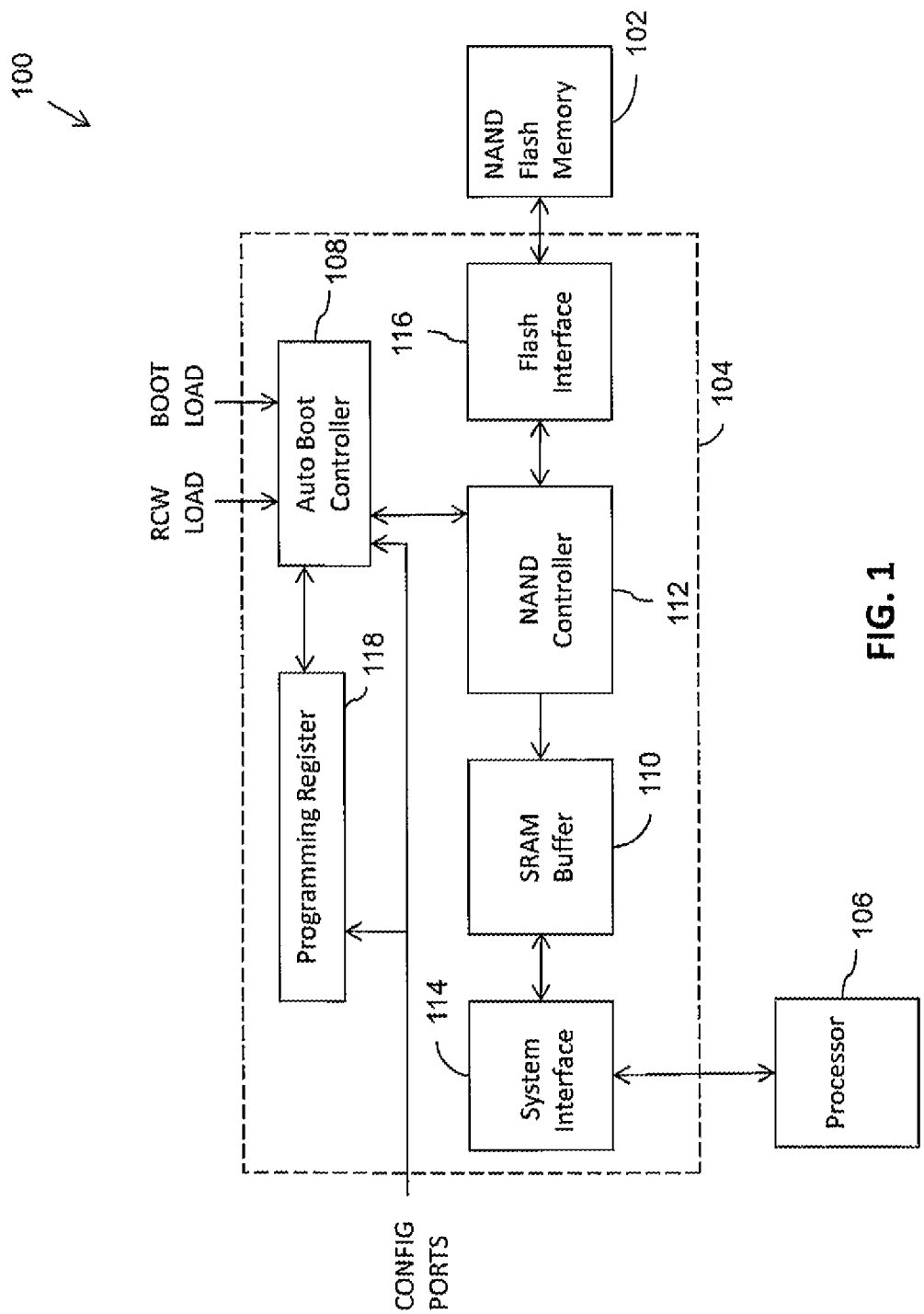
FIG. 1 is a schematic block diagram of a system for booting an electronic device from a NAND flash memory in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein, the term "fetch" refers to retrieving data stored in a memory or a register of the system.

In an embodiment of the present invention, a method for fetching a pre-boot code from a NAND flash memory by a NAND flash controller for booting an electronic device is provided. The NAND flash memory includes a plurality of memory blocks and each memory block includes a plurality of pages. A first set of boot parameters are loaded into a programming register of the NAND flash controller on receiving an event that triggers the booting. A good memory block in which the pre-boot code is store is identified based on the first set of boot parameters, by checking at least one of first, second and last pages of a memory block. A first portion of the pre-boot code is fetched from the good memory block, by the NAND flash controller, based on the event trigger type.

In another embodiment of the present invention, a system for booting an electronic device is provided. The system includes a NAND flash memory that stores a pre-boot code. The NAND flash memory includes a plurality of memory blocks and each memory block includes a plurality of pages. A NAND flash controller is connected to the NAND flash memory and includes an auto-boot controller, a programming register and a NAND flash controller. The auto-boot controller receives a prompt from the electronic device that indicates an event type that triggers the booting. The programming register is connected to the auto-boot controller and stores a first set of boot parameters. The NAND flash controller is connected to the NAND flash memory, the programming register and the auto-boot controller and identifies a good memory block in which the pre-boot code is stored based on the first set of booting parameters, by checking at least one of first, second and last pages of a memory block. The NAND flash controller further fetches a first portion of the pre-boot code from the good memory block based on the event type. A processor is connected to the NAND flash controller for receiving the first portion of the pre-boot code and initiating the booting of the electronic device.

Various embodiments of the present invention provide a system and method for booting an electronic device from a NAND flash memory. The system includes a NAND flash controller that is configured to identify the event type (RCW load prompt or boot load prompt) that triggers the booting and accordingly fetch the correct portion of the pre-boot code, stored in the NAND flash memory, for booting the electronic device. As opposed to conventional NAND flash controllers that fetch the entire pre-boot code for both the event triggers, the NAND flash controller of the present invention fetches only a portion of the pre-boot code for the boot load prompt, which makes the booting process fast and efficient. For a boot load prompt, the NAND flash controller can operate at different boot frequencies (including the maximum boot frequency) based on the boot frequency of a NAND flash memory to which it is connected. Thus, the boot speed can be increased for NAND flash memories with higher boot frequencies and can be relaxed for NAND flash memories that operate at lower frequencies. The NAND flash controller offers flexibility in searching for a good memory block by optionally searching first and second or first and last pages of a memory block.

Referring now to FIG. 1, a schematic diagram illustrating a system 100 for booting an electronic device (not shown) from a NAND flash memory 102, in accordance with an embodiment of the present invention, is shown. The system 100 includes the NAND flash memory 102, a NAND flash controller 104, and a processor 106. Examples of the electronic device include microprocessors, microcontroller units (MCUs), systems-on-chips (SOCs), and application specific integrated circuits (ASICs) that are used in a wide variety of applications including industrial applications, automobiles, home appliances, and handheld devices. The processor 106 controls the functional operations of the electronic device including booting of the electronic device. The NAND flash controller 104 is connected to the NAND flash memory 102 and the processor 106, and includes an auto-boot controller 108, a memory buffer 110, a NAND controller 112, a system interface 114, a flash interface 116, and a plurality of programming registers 118. In an embodiment of the present invention, the NAND flash controller 104 may be integrated or integral with the processor 106. In various embodiments of the present invention, the NAND controller 112 communicates with the NAND flash memory 102 using a set of interface signals defined by the Open NAND Flash Interface (ONFI) Working Group, that include chip enable (CE), address latch enable (ALE), command latch enable (CLE), write enable (WE), read enable (RE) and write protected (WP) signals. These signals are known to those of skill in the art and therefore a detailed description of the communication process/protocol has been omitted from the present description.

The NAND flash memory 102 includes multiple memory blocks and each memory block includes multiple pages. For example, a 2 gigabit (GB) NAND flash memory includes 2,048 (2 k) memory blocks and each memory block includes 64 pages. Each page stores 2 k+64 bytes of data, i.e., each memory block stores 128+4 k bytes of data. A memory block may be a good memory block or a bad memory block. A good memory block stores the required pre-boot code, whereas a bad memory block is corrupted and holds no data. Each memory block further includes a bad block indicator (BBI) that indicates whether the memory block is a good or bad memory block. For example, 1 byte is allocated for storing the BBI in an 8-bit port sized NAND flash memory and 2 bytes in a 16-bit port sized NAND flash memory. The auto-boot controller 108 is configured to receive event triggers from various components of the electronic device, for fetching the pre-boot code. In various embodiments of the present invention, the auto-boot controller 108 receives two types of event triggers: a reset configuration word (RCW) load prompt and a boot load prompt, both of which may be triggered when the electronic device is switched on (reset or powered on).

The programming register 118 is connected to the auto-boot controller 108 and based on the event trigger type received by the auto-boot controller 108, boot parameters are loaded in to the programming register 118, by way of the configuration (CONFIG) ports of the electronic device. In various embodiments of the present invention, the boot parameters may include a maximum booting frequency of the NAND flash memory 102, a frequency scaling index (for the maximum booting frequency), a RCW clock frequency parameter, page and port sizes, pages/block information, an error correction code (ECC) decoder enable, and a location of the BBI associated with each memory block. In an embodiment of the present invention, the programming register 118 includes an interface timing control register (not shown) that stores a boot frequency that determines the rate at which the NAND controller 112 fetches the pre-boot code from the NAND flash memory 102. The maximum boot frequency is the maximum frequency at which the NAND flash memory 102 operates. If the NAND flash memory 102 operates at a frequency that is less than the maximum boot frequency, the maximum boot frequency is scaled down using the frequency scaling index. The scaled boot frequency is then loaded into the interface timing control register. For the RCW load prompt, a RCW load frequency is calculated using the RCW clock frequency parameter and is loaded into the interface timing control register. An ECC decoder enable is used to check the pre-boot code for errors. Page size refers to the size of each page of a memory block (i.e., 2 k+64 bytes for the 2 GB NAND flash memory described above). The port size refers to the data bus width of the NAND flash memory 102, based on which the NAND controller 112 stores either 8-bit or 16-bit of pre-boot code data for each memory read cycle. The location of the BBI refers to an address of the first word of a spare region in a page.

The NAND controller 112 is connected to the auto-boot controller 108 and the programming register 118. The NAND controller 112 is further connected to the NAND flash memory 102 by way of the NAND flash interface 116. The NAND flash interface 116 facilitates proper signal generation and data synchronization. When an event trigger is received by the auto-boot controller 108, the NAND controller 112 fetches the pages/block information from the programming register 118 and starts searching for a good memory block in the NAND flash memory 102. In one embodiment of the present invention, the NAND controller 112 checks BBIs of the first and last pages of a memory block. If the BBIs indicates a bad memory block, the NAND controller 112 proceeds to the next memory block and continues the check until a good memory block is identified. In another embodiment of the present invention, the NAND controller 112 checks BBIs of the first and second pages of a memory block. If the BBIs indicate a bad memory block, the NAND controller 112 proceeds to the next memory block and continues the check until a good memory block is identified.

Upon identifying a good memory block, the NAND controller 112 fetches the pre-boot code from the good memory block. If the event trigger is a RCW load prompt, the NAND controller 112 operates at the RCW load frequency and fetches the pre-boot code from a predetermined number of pages of the good memory block. For a 2 GB NAND flash memory, the NAND controller 112 fetches the pre-boot code from one page (i.e., 2 KB of pre-boot code) of the good memory block, for an RCW load prompt. If the event trigger is a boot load prompt, the NAND controller 112 operates at the maximum boot frequency or the scaled booting frequency (based on the boot frequency of the NAND flash memory 102) and fetches the entire pre-boot code from the good memory block. For a 2 GB NAND flash memory, the NAND controller 112 fetches pre-boot code from four pages (i.e., 8 KB of pre-boot code) of the good memory block for a boot load prompt.

In an embodiment of the present invention, the NAND controller 112 stalls for a predetermined time after fetching one page of the pre-boot code for an RCW load prompt and checks whether a boot load prompt is received. If the boot load prompt is received, the NAND controller 112 switches to the maximum boot frequency or the scaled booting frequency and fetches the remaining three pages of the pre-boot code.

Upon fetching the pre-boot code, the NAND controller 112 checks the pre-boot code for errors using the ECC decoder enable parameter and temporarily buffers the pre-boot code in the memory buffer 110, which is subsequently provided to the processor 106, by way of the system interface 114. The processor 106 then initiates the boot process using the pre-boot code.

Figure 2:
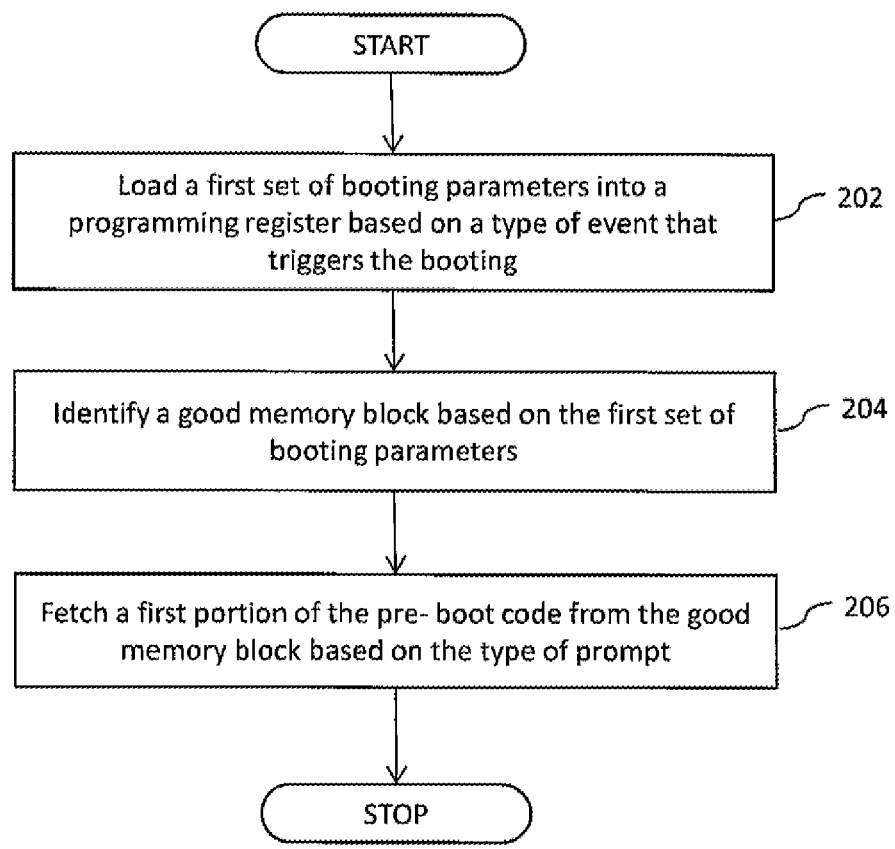
FIG. 2 is a flowchart depicting a method for fetching a pre-boot code from a NAND flash memory by a NAND flash controller in accordance with an embodiment of the present invention.

Referring now to FIG. 2, a flowchart depicting a method for fetching the pre-boot code from the NAND flash memory 102 by the NAND flash controller 104 in accordance with an embodiment of the present invention is shown. Steps of the flowchart of FIG. 2 will be explained in conjunction with FIG. 1.

At step 202, a first set of boot parameters are loaded into the programming register 118 when the auto-boot controller 108 receives an event trigger. The auto-boot controller 108 receives two types of event triggers: the RCW load prompt and the boot load prompt, both of which may be triggered when the electronic device is either powered on or reset. The boot parameters include a maximum boot frequency of the NAND flash memory 102, a frequency scaling index (for the maximum booting frequency), an RCW clock frequency parameter, page and port sizes, pages/block information, an error correction code (ECC) decoder enable, and location of the BBI associated with each memory block.

At step 204, the NAND controller 112 identifies a good memory block by checking BBIs of either the first and last or the first and second pages of a memory block. The NAND controller 112 uses the pages/block information from the programming register 118 to perform the good memory block search. At step 206, the NAND controller 112 fetches a first portion of the pre-boot code from the good memory block. If the event trigger is a RCW load prompt, the NAND controller 112 operates at the RCW load frequency and fetches the pre-boot code from a predetermined number of pages of the good memory block. If the event trigger is a boot load prompt, the NAND controller 112 operates at the maximum boot frequency (or the scaled boot frequency) and fetches the complete pre-boot code from the good memory block.

Figure 3:
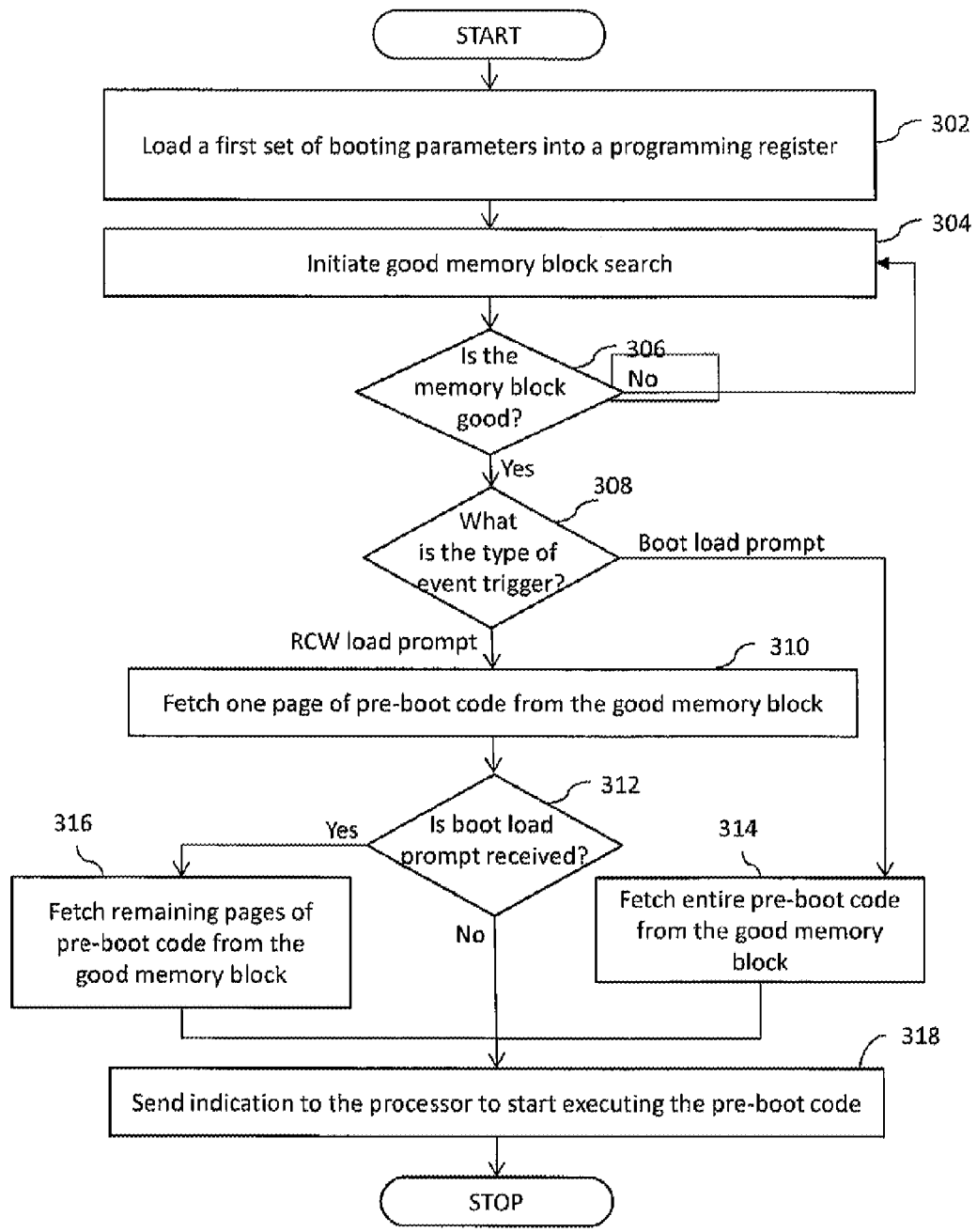
FIG. 3 is a more detailed flowchart depicting a method for fetching a pre-boot code from a NAND flash memory by a NAND flash controller in accordance with an embodiment of the present invention.

Referring now to FIG. 3, a detailed flowchart depicting a method for fetching the pre-boot code from the NAND flash memory 102, by the NAND flash controller 104, in accordance with an embodiment of the present invention is shown.

At step 302, the boot parameters are loaded into the programming register 118 when the auto-boot controller 108 receives an event trigger. At step 304, the NAND controller 112 initiates the search for a good memory block. Steps 302 and 304 are similar to steps 202 and 204 of FIG. 2. At step 306, the NAND controller 112 checks if a memory block is a good memory block by checking BBIs of either the first and last or the first and second pages of the memory block. Step 306 is repeated until a good memory block is identified, after which step 308 is executed.

At step 308, the NAND controller 112 checks the type of the event trigger received by the auto-boot controller 108. If the event trigger is an RCW boot prompt, step 310 is executed, at which step the NAND controller 112 operates at the RCW load frequency and fetches the pre-boot code from a predetermined number of pages of the good memory block. After step 310, the NAND controller 112 stalls for a predetermined time to check if a boot load prompt is received at step 312. If the boot load prompt is received at step 312, step 316 is executed, at which step the NAND controller 112 switches to the maximum boot frequency or the scaled booting frequency (based on the boot frequency of the NAND flash memory 102) and fetches remaining pages of the pre-boot code from the good memory block. Step 318 is executed after step 316. If the boot load prompt is not received at step 312, step 318 is executed. At step 318, the NAND controller 112 sends an indication to the processor 106 to start executing the pre-boot code. If the event trigger is a boot load prompt (at step 308), step 314 is executed, at which step the NAND controller 112 operates at the maximum boot frequency or the scaled boot frequency (based on the boot frequency of the NAND flash memory 102) and fetches the entire pre-boot code from the good memory block. Step 318 is executed after step 314 and has been explained above.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for fetching a pre-boot code from a NAND flash memory by a NAND flash controller, for booting an electronic device, wherein the NAND flash memory includes a plurality of memory blocks and each memory block includes a plurality of pages, the method comprising:
   loading a first set of boot parameters into a programming register of the NAND flash controller upon receipt of a boot triggering event;
   identifying a good memory block in which the pre-boot code is stored based on the first set of boot parameters by checking at least one of first, second and last pages of a memory block;
   identifying an event trigger type of the boot triggering event; and
   fetching a first portion of the pre-boot code, by the NAND flash controller, from the identified good memory block based on the event trigger type.

2. The method of claim 1, wherein the first set of boot parameters includes at least one of a maximum boot frequency, a frequency scaling index, a reset configuration word (RCW) clock frequency parameter, a page size, a port size, pages/block, an ECC decoder enable, and a location of a bad block indicator (BBI) associated with each memory block.

3. The method of claim 2, further comprising checking the BBI of a memory block, by the NAND flash controller, to identify the good memory block.

4. The method of claim 2, wherein the first portion of the pre-boot code includes pre-boot code from at least one page of the good memory block when the event trigger type is a RCW load prompt.

5. The method of claim 4, further comprising determining a RCW loading frequency of the NAND flash memory based on the RCW clock frequency parameter.

6. The method of claim 5, further comprising fetching the pre-boot code from the at least one page at the RCW loading frequency.

7. The method of claim 2, further comprising fetching the first portion and a second portion of the pre-boot code from the good memory block at a maximum boot frequency of the NAND flash memory when the event trigger type is a boot load prompt.

8. The method of claim 7, further comprising scaling the maximum boot frequency based on the frequency scaling index.

9. The method of claim 1, further comprising:
stalling for a predetermined time after fetching one page of the pre-boot code for a RCW load prompt and checking whether a boot load prompt is received.

10. A system for booting an electronic device, comprising:
a NAND flash memory for storing a pre-boot code, wherein the NAND flash memory includes a plurality of memory blocks, each memory block including a plurality of pages;
a NAND flash memory controller, connected to the NAND flash memory, including:
an auto-boot controller for receiving a prompt from the electronic device, wherein the prompt indicates an event trigger type that triggers booting of the electronic device;
a programming register, connected to the auto-boot controller, for storing a first set of boot parameters; and
a NAND controller, connected to the NAND flash memory, the programming register and the auto-boot controller, for identifying a good memory block in which the pre-boot code is stored based on the first set of boot parameters, by checking at least one of first, second and last pages of a memory block, identifying the event trigger type, and fetching a first portion of the pre-boot code from the identified good memory block based on the event trigger type; and
a processor, connected to the NAND flash controller, for receiving the first portion of the pre-boot code and initiating the booting of the electronic device.

11. The system of claim 10, wherein the first set of boot parameters includes at least one of a maximum boot frequency, a frequency scaling index, a reset configuration word (RCW) clock frequency parameter, a page size, a port size, pages/block, an ECC decoder enable and a location of bad block indicator (BBI) associated with each memory block.

12. The system of claim 11, wherein the NAND flash controller fetches the pre-boot code from at least one page of the identified good memory block at a RCW load frequency of the NAND flash memory when the event trigger type is a RCW load prompt.

13. The system of claim 11, wherein the NAND flash controller fetches the first portion and a second portion of the pre-boot code from the identified good memory block at a maximum boot frequency of the NAND flash memory when the event trigger type is a boot load prompt.

14. The system of claim 10, wherein the NAND controller stalls for a predetermined time after fetching one page of the pre-boot code for a RCW load prompt and checking whether a boot load prompt is received.

* * * * *